United States Patent [19]

Frailey et al.

[11] Patent Number: 4,551,160
[45] Date of Patent: Nov. 5, 1985

[54] METHOD AND APPARATUS FOR FORMING GLASS FILAMENTS

[75] Inventors: Richard C. Frailey; Alex P. Symborski, both of Anderson, S.C.

[73] Assignee: Owens-Corning Fiberglas Corporation, Toledo, Ohio

[21] Appl. No.: 663,288

[22] Filed: Oct. 22, 1984

[51] Int. Cl.⁴ .................. C03B 37/02; D01G 1/04
[52] U.S. Cl. ........................... 65/2; 65/10.2; 83/37; 83/347; 83/913
[58] Field of Search ............... 65/2, 10.2; 83/37, 347, 83/913

[56] References Cited

U.S. PATENT DOCUMENTS

| | | | |
|---|---|---|---|
| 4,163,653 | 8/1979 | Symborski et al. | 65/2 |
| 4,175,939 | 11/1979 | Nakazawa et al. | 65/10.2 X |
| 4,347,071 | 8/1982 | Willis et al. | 65/10.2 |
| 4,411,180 | 10/1983 | Roncato | 83/37 |

Primary Examiner—Robert Lindsay
Attorney, Agent, or Firm—Ronald C. Hudgens; Greg Dziegielewski

[57] ABSTRACT

Method and apparatus are provided for forming glass filaments wherein a transfer guide means is movable between a strand threadup position and a transfer zone immediately adjacent the primary attenuation means, said transfer guide being adapted to move a strand about to be restarted which is being advanced by a secondary attenuation means into contact with the primary attenuation means to be advanced thereby and to release such strand when said transfer guide is at a predetermined zone to permit the transfer of such strand being advanced by the secondary attenuation means to the primary attenuation means in the absence of reducing the speed of the primary attenuation means.

13 Claims, 5 Drawing Figures

METHOD AND APPARATUS FOR FORMING GLASS FILAMENTS

TECHNICAL FIELD

The invention disclosed herein relates to the production of discrete segments of glass strand formed directly from continuous filaments as they are being produced.

BACKGROUND

In the quest for increased operating efficiencies and the like in the production of discrete segments of glass fiber strands or "chopped strand", a number of advancements have been made. A more recent advancement includes concommitantly drawing continuous glass fibers from a plurality of spaced-apart feeders adapted to supply a plurality of strands to a chopper wherein the cot wheel of the chopper acts as a pull wheel to attenuate the streams of molten material issuing from the feeders into filaments. As set forth in U.S. Pat. No. 4,194,896, issued on Mar. 25, 1980, the apparatus is arranged to permit continuous operation of the system in spite of a disruption in one or more of the feeders. To facilitate the restart of such disrupted positions, the primary attenuation means or chopper of the aforementioned patent was reduced in speed for a brief period of time.

During that period of reduced speed, the chopped strand product that was produced from all the feeders was unacceptable and, therefore, dealt with as scrap.

The present invention provides a system wherein the strands from the disrupted feeders may be rethreaded or restarted through the chopper in the absence of reducing the speed of the chopper from the normal production speed. Thus, the amount of scrap is reduced, and the amount of good product is increased.

DISCLOSURE OF THE INVENTION

This invention pertains to apparatus comprising a plurality of feeder means adapted to supply streams of molten inorganic material, such as glass; a primary attenuation means adapted to draw said molten streams into continuous filaments; a secondary attenuation means adapted to attenuate at least some of said glass streams into continuous filaments; a transfer guide means movable between a strand threadup position and a transfer zone immediately adjacent the primary attenuation means, said transfer guide being adapted to move said strand being advanced by the secondary attenuation means into contact with the primary attenuation means to be advanced thereby and to release said strand being advanced by the secondary attenuation means when said transfer guide is at a predetermined zone to permit the transfer of said strand being advanced by the secondary attenuation means to the primary attenuation means in the absence of reducing the speed of the primary attenuation means.

BEST MODE OF CARRYING OUT THE INVENTION

Figure 1:
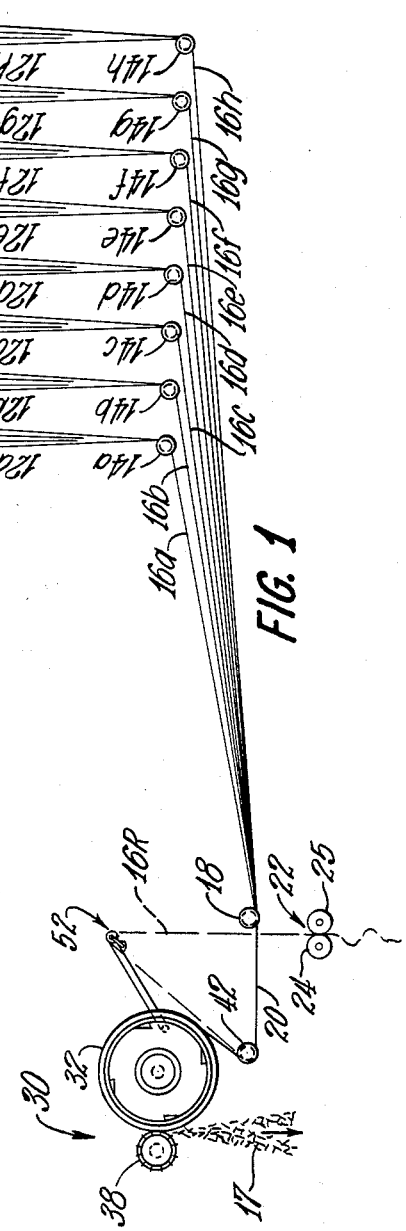
FIG. 1 is a semi-schematic, front elevational view of a multifeeder, forming position according to the principles of this invention.
Figure 2:
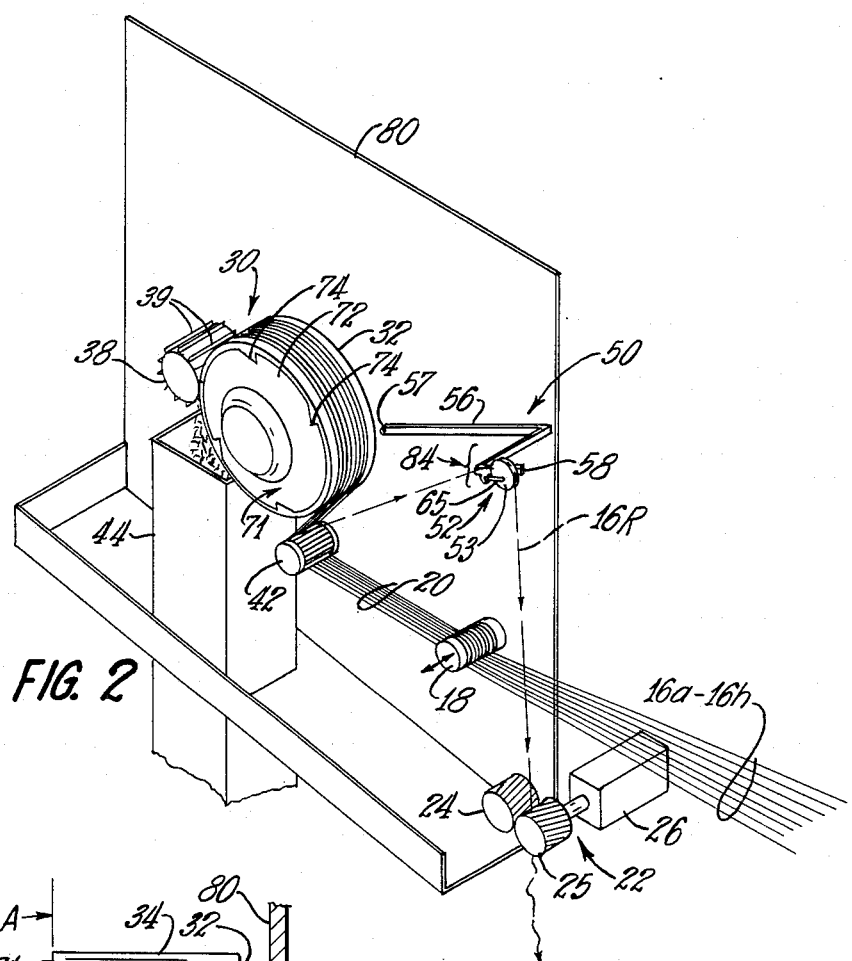
FIG. 2 is an enlarged view of the strand severing-filament drawing system of the system shown in FIG. 1.
Figure 3:
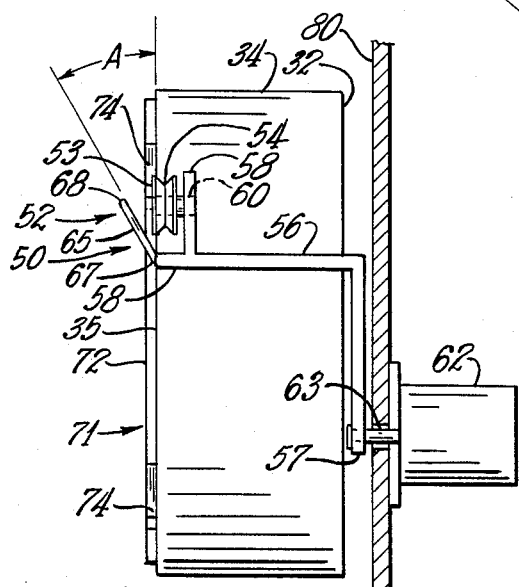
FIG. 3 is a side view of the primary attenuation means and restart transfer means according to the principles of this invention.

As shown in FIGS. 1 and 2, discrete segments, or strands 17 of glass fibers or filaments, are produced from a plurality of spaced-apart feeders 10a through 10h. The groups of filaments 12a through 12h are drawn from feeders 10a through 10h, respectively, through the action of primary attenuation and severing means, or chopper 30, as is known in the art. The feeders, size applicating systems (not shown), various guides and pulleys may be oriented as set forth in the aforementioned U.S. Pat. No. 4,194,896, which is hereby incorporated by reference. Each of the groups of filaments 12a through 12h are gathered into strands or bundles of filaments 16a through 16h at gathering shoes 14a through 14h, respectively.

The advancing strands 16 are oriented as a planar band of strands 20 by means of grooved guide 18 and idler roll 42. Grooved guide 18 may consist of a plurality of parallel, circumferential grooves about a roll or cylinder. Further, groove guide 18 may be oscillated back and forth along its central access to move the strands back and forth across the face of the cot roll 32 of chopper 30 as is known in the art.

Idler roll 42, which may be of the type disclosed in U.S. Pat. No. 4,191,079, is positioned to bring the strands 16 into engagement with the surface of first rotatable member or cot roll 32.

A primary attenuation and severing means 30 is comprised of a driven, first rotatable member or cot roll 32 and a second rotatable member or cutter roll 38. Typically, the circumferential surface 34 of first rotatable member 32 is provided with an elastomeric layer to facilitate the attenuation and severing process. Second rotatable member, or cutter roll 38, conveniently includes a plurality of radially extending blades 39 which contact circumferential surface 34 of cot roll 32 to sever the continuous strands 16 into the discrete segments 17 which are conveniently gathered by collection chute 44.

To provide the startup of a strand with the primary attenuation means otherwise running at full speed, a secondary or interim attenuation or advancement means 22 and a strand transfer means 50 are provided according to the principles of this invention.

As shown, secondary attenuation means 22 is conveniently comprised of a pair of pull rolls 24 and 25 and a motor 26. Preferably, pull rolls 24 and 25 have mating helical teeth with pull roll 25 being driven by motor 26 to advance or pull the strand that is about to be started or restarted therethrough at a predetermined speed. Pull rolls 24 and 25 may be formed of an elastomeric material to facilitate the grip on strand or strands 16.

For the purposes of this discussion, the strand of continuous glass filaments that is to be started or restarted through primary attenuation means 30 is designated as 16r in the drawings.

Strand transfer means 50 operates to move strand 16r into engagement with the primary attenuation means 30 while the strand 16r is being advanced by means of secondary attenuation means 22 without requiring that the speed of cot roll 32 be reduced.

When transfer means 50 is activated, strand 16r is brought into engagement with the circumferential surface 34 of cot wheel 32 and, ultimately, between the nip of cot wheel 32 and cutter roll 38 to provide continuous production of chopped strand 17, the transfer preferably occurring while cot roll 32 is driven at normal production speed.

Conveniently, transfer means 50 is comprised of a transfer guide 52 that is movable between a threadup position or zone 84 and a transfer zone 87, where the strand 16r is transferred to primary attenuation means 30. Transfer guide 52 may be of any suitable shape and moved or transferred by any suitable means such as cam, slide or the like. As shown, transfer guide 52 is comprised of a disk-like element 53 having a circumferential groove 54 adapted to receive strand 16r therein and a projection 65 adjacent thereto.

As shown, transfer guide 52 is moved through an arc by means of pivoting arm 56. Arm 56 pivots about first end 57 which is attached to shaft 63 of motive means or actuator 62. Disk 53 is joined to the second or distal end 58 of arm 56 by means of journal or pin 60. A projection 65, which may conveniently be a brass rod or the like, extends alongside disk 53 to assist in the release of strand 16r from disk 53. As shown, first end 67 of projection 65 is attached to arm 56 at the distal end 58 thereof, and distal end 68 of projection 65 is spaced from disk 53.

Figure 4:
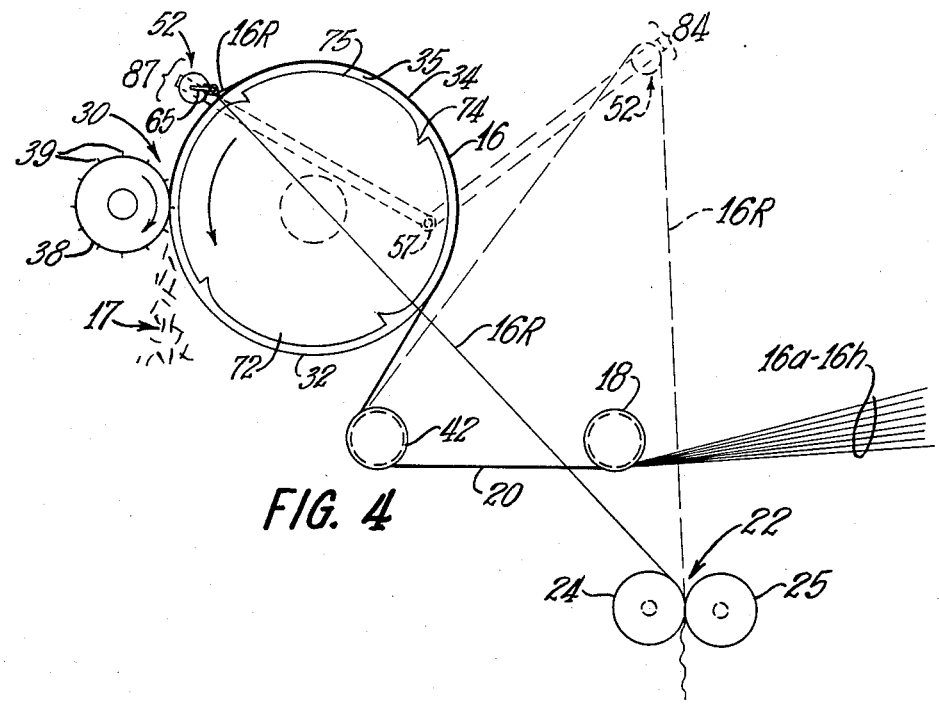
FIG. 4 is a semi-schematic frontal view of the strand restart transfer means at the thread-up position and a point during the transfer procedure.
Figure 5:
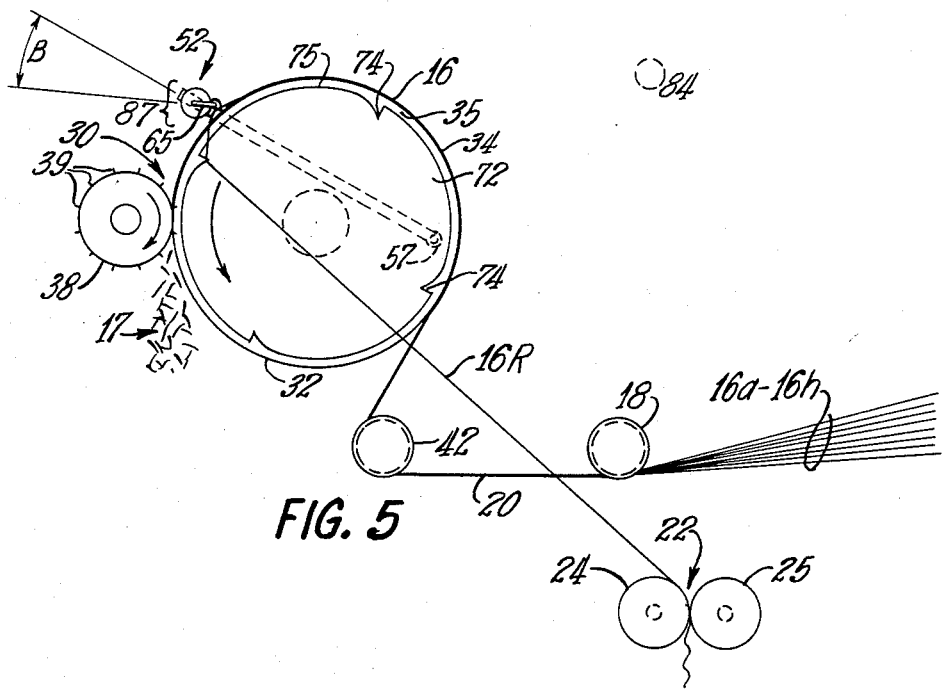
FIG. 5 is a semi-schematic frontal view of the restart system at the point of transfer to the primary attenuation means.

Projection 65 is angled away from the face of disk 53 at an angle A. Further, projection 65 is, as shown in FIGS. 4 and 5, oriented or angled to one side of disk 53, forming an angle B. Such angles, if any, and orientation are determined by the relative position of the interim advancement means 22, type and design of transfer guide 52 and position of cot roll 32 of chopper 30.

To start the forming process from any associated feeder 10 the forming room operator manual pulls such filaments 12 over the appropriate gathering shoe 14 and positions the strand 16r of such filaments in grooved guide 18 and around idler roll 42 to position strand 16r along side band 20 of the "running" strands. From idler roll 42 strand 16r is then deposited in or contacts transfer guide 52 and then is fed into secondary attenuation means 22. At that time, secondary attenuation means 22 is advancing strand 16r at a predetermined speed sufficient to establish an appropriate filament forming process from that feeder 10. The speed of strand 16r, being advanced by secondary means 22, need not be identical to that of the other strands being advanced by primary attenuation means 30.

With the strand 16r appropriately threaded around idler roll 42, transfer means 52 and into an operating secondary attenuation means 22, the operator activates motor or actuator 62 by any convenient means, such as a switch (not shown) to rotate arm 56 such that transfer guide 52 moves from the "threadup" or "ready" position 84 to the transfer zone 87. Conveniently, motor 62 may be secured to wall or partition 80 associated with primary attenuation means 30.

During the movement of transfer guide 52 from the threadup position 84 to the transfer zone or position 87, that section of strand 16r advancing from idler roll 42 to transfer guide 52 is brought into engagement with the circumferential surface 34 of cot wheel 32. Also during that movement, that section of strand 16r moving from transfer guide 52 to secondary advancement means 22 contacts the outside of projection 65, and as the transfer guide 52 approaches or enters transfer zone 87, projection 65 urges strand 16r out of groove 54 of disk 53 as shown in FIG. 4.

As the advancement of strand 16r is increasingly promoted by the cot wheel 32 of primary attenuation means 30, the strand 16r releases from transfer guide 52 and is carried between the nip of the cot roll 32 and cutter roll 38 to effect a complete transfer to normal production operation.

Since the strands 16 are wet with a lubricious sizing material or coating, in most instances, the grasp of surface 34 of strand 16r during transfer is not necessarily satisfactory. To assist in the transfer operation, a strand grasping means 71 is associated with cot wheel 32 to mechanically grasp strand 16r during transfer to pull the strand 16r with cot roll 32 to permit strand 16r to be carried between cutter roll 38 and cot roll 32.

As shown, strand grasphing means 71 is conveniently comprised of a plate 72 having at least one but preferably a plurality of notches 74 located along the circumferential periphery of circular plate 72. Plate 72 is rigidly secured to the face 35 of cot roll 32 and rotates therewith. Plate 72 may be fastened to the face 35 of cot wheel 32 by any suitable means such as screw-type fasteners.

As shown in FIGS. 4 and 5, the edge 75 of plate 72 is located immediately adjacent the circumferential surface 34 along face 35 of cot wheel 32. Further, the diameter of edge 75 is slightly less than the diameter of circumferential surface 34, but edge 75 is sufficiently close to surface 34 such that strand 16r is temporarily captured by a notch 74 to positively grasp strand 16r to ensure that portion of strand 16r in contact with circumferential surface 34 passes between the nip of cot roll 32 and cutter roll 38.

Thus, any of the strands from the associated feeders may be started or restarted in the absence of reducing the speed of the primary attenuation and severing means from the normal production speed.

Once strand 16r passes between the nip of cot roll 32 and cutter roll 38, that segment of strand 16r between the nip of cot roll 32 and cutter roll 38 and secondary advancement means 22 is pulled from the area by secondary advancement means 22.

It is to be noted that the principles of the instant invention may also be applicable to the production of continuous strands of glass filaments as well as to the production of discrete segments thereof. That is, the continuous strands need not be continuously severed at the primary attenuation means.

It is apparent that within the scope of the present invention, modifications and different arrangements can be made other than as herein disclosed. The present disclosure is merely illustrative with the invention comprehending all variations thereof.

INDUSTRIAL APPLICABILITY

The invention described herein is readily applicable to the glass fiber industry.

We claim:
1. Apparatus for forming glass filaments comprising:
   feeder means adapted to supply streams of molten glass;
   a primary attenuation means adapted to draw said molten streams into continuous filaments;

a secondary attenuation means adapted to attenuate at least some of said glass streams into continuous filaments;

a gathering means for gathering said filaments into a plurality of strands; and a transfer guide means movable between a strand threadup position and a transfer zone immediately adjacent the primary attenuation means, said transfer guide means being adapted to move said strand being advanced by the secondary attenuation means into contact with the primary attenuation means to be advanced thereby and to release said strand being advanced thereby when said transfer guide is at said transfer zone to permit the transfer of said strand being advanced by the secondary attenuation means to the primary attenuation means in the absence of reducing the speed of the primary attenuation means.

2. The apparatus of claim 1 further comprising a strand capturing means associated with said primary attenuation means adapted to grasp said strand being transferred to the primary attenuation means from the secondary attenuation means.

3. The apparatus of claim 2 wherein said primary attenuation means is adapted to sever the continuous strands into discrete segments.

4. Apparatus for producing discrete segments of strands of glass filaments comprising:

a plurality of spaced apart feeder means adapted to supply streams of molten glass;

a first rotatable member adapted to draw said molten streams into continuous filaments, said filaments being arranged in substantially parallel strands along the circumferential periphery of said first rotatable member;

a second rotatable member associated with said first rotatable member cooperating to severe said continuous strands into discrete segments;

a secondary attenuation means adapted to draw at least some of said streams into continuous filaments when such filaments are not being drawn by said first rotatable member, such filaments being gathered into a strand;

a transfer guide means movable between a strand threadup position and a strand transfer zone immediately adjacent the first rotatable member said transfer guide means being positioned to bring said continuous strand being advanced by the secondary attenuation into contact with the periphery of said first rotatable member; and a strand capturing means positioned adjacent the periphery of said first rotatable member adapted to grasp said continuous strand advancing from said feeder means to said secondary attenuation means when said transfer guide means is at the strand transfer zone, said strand capturing means cooperating with said first rotatable member, said transfer guide means and secondary attenuation means to move the continuous strand being advanced by the secondary attenuation means between the first rotatable member and second rotatable member to cause such strand to be advanced by the primary attenuation means and to be severed into discrete segments as a continuous operation in the absence of reducing the speed of the first rotatable member.

5. The apparatus of claim 4 wherein said transfer guide means is comprised of a disk-like element having a groove about the periphery thereof; said disk-like element being attached to a pivoting arm attached to an actuator means.

6. The apparatus of claim 4 further comprising a strand capturing device joined to said first rotatable member at the face thereof adapted to grasp said strand to facilitate the transfer from the secondary attenuation means to the first rotatable member.

7. The apparatus of claim 6 wherein said strand capturing means is comprised of a plate having at least one notch along the edge thereof adapted to mechanically grasp the transferring strand therein.

8. The apparatus of claim 7 wherein said transfer guide means further comprises a projection extending from said arm adjacent said disk-like element adapted to urge the transferring strand out of the groove in the disk-like element as said tranfer guide moves through said transfer zone.

9. The apparatus of claim 8 wherein said transfer guide releases the transferring strand prior to the transferring strand passing between the point of contact of the first and second rotatable members.

10. The apparatus of claim 8 wherein said transfer guide is positioned adjacent the junction of the circumferential periphery and face of the first rotatable member when said transfer guide is within said transfer zone.

11. A method of producing discrete segments of strands of glass filaments comprising:

supply a plurality of streams of molten glass;

drawing some of said streams into a body of continuous filaments at a first attenuation means;

gathering said body filaments into a plurality of strands;

severing said plurality of strands into discrete segments;

drawing other of said streams into group of continuous filaments at a second attenuation means spaced from said first attenuation means;

gathering said group of filaments into a strand;

positioning said strand associated with said second attenuation means adjacent said first attenuation means;

while maintaining the advancement of said strand by said second advancement means, moving a portion of such strand into contact with said first attenuation means to initiate advancement thereof by the first attenuation means; and severing said strand associated with the second attenuation means and in contact with the first attenuation means to transfer the attenuation of such strand to the first attenuation means concommittantly with said plurality of strands in the absence of changing the speed of the first attenuation means.

12. The method of claim 11 wherein the speed of the second attenuation means is less than the speed of the first attenuation means.

13. The method of claim 11 wherein said moving step comprises contacting said strand with a transfer guide means and disengaging said strand from said transfer guide means at a predetermined zone.

* * * * *